US007908189B2

(12) United States Patent
Chan et al.

(10) Patent No.: US 7,908,189 B2
(45) Date of Patent: Mar. 15, 2011

(54) SYSTEM, METHOD, AND COMPUTER PROGRAM PRODUCT FOR AUTOMATICALLY POSTING TRANSACTIONS ASSOCIATED WITH A TRANSACTION ACCOUNT INTO A GENERAL LEDGER

(75) Inventors: Cheung Tat Chan, Fanwood, NJ (US); Andrew L. Gorrin, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 470 days.

(21) Appl. No.: 11/361,989

(22) Filed: Feb. 27, 2006

(65) Prior Publication Data
US 2007/0185791 A1    Aug. 9, 2007

Related U.S. Application Data

(60) Provisional application No. 60/741,449, filed on Dec. 2, 2005.

(51) Int. Cl.
*G07B 17/00* (2006.01)
(52) U.S. Cl. .................. 705/30; 705/35; 705/8

(58) Field of Classification Search .......... 705/30, 705/35
See application file for complete search history.

(56) References Cited

U.S. PATENT DOCUMENTS

| 5,117,356 | A | * | 5/1992 | Marks | 705/30 |
|---|---|---|---|---|---|
| 6,058,375 | A | * | 5/2000 | Park | 705/30 |
| 6,633,907 | B1 | * | 10/2003 | Spencer et al. | 709/223 |
| 7,240,028 | B1 | * | 7/2007 | Rugge | 705/30 |
| 7,363,261 | B2 | * | 4/2008 | Whitehead et al. | 705/30 |
| 2002/0111891 | A1 | * | 8/2002 | Hoffman et al. | 705/36 |
| 2004/0148233 | A1 | * | 7/2004 | Lee | 705/30 |
| 2005/0137946 | A1 | * | 6/2005 | Schaub et al. | 705/30 |
| 2005/0234786 | A1 | * | 10/2005 | Aggarwal | 705/30 |
| 2005/0289025 | A1 | * | 12/2005 | Fredericks et al. | 705/30 |
| 2006/0167771 | A1 | * | 7/2006 | Meldahl | 705/30 |
| 2007/0005509 | A1 | * | 1/2007 | Spiller et al. | 705/65 |

* cited by examiner

*Primary Examiner* — Vanel Frenel
(74) *Attorney, Agent, or Firm* — Snell & Wilmer L.L.P.

(57) ABSTRACT

A system, method, and computer program product are used to automatically post substantially all transactions associated with a transaction account into a general ledger. Recent transaction data associated with the transaction account is received. The recent transaction data is compared (e.g., matched) to stored and categorized transaction data in the general ledger to determine a new transaction data portion of the recent transaction data. The new transaction data portion is categorized. The categorized new transaction data portion is stored in the general ledger.

17 Claims, 4 Drawing Sheets

SYSTEM, METHOD, AND COMPUTER PROGRAM PRODUCT FOR AUTOMATICALLY POSTING TRANSACTIONS ASSOCIATED WITH A TRANSACTION ACCOUNT INTO A GENERAL LEDGER

CROSS REFERENCE TO RELATED APPLICATIONS

This application claims priority under 35 U.S.C. §119(e) to U.S. Provisional Patent Application No. 60/741,449, filed Dec. 2, 2005, which is incorporated by reference herein in its entirety.

BACKGROUND

1. Field of the Invention

The present invention generally relates to automatically posting transactions associated with a transaction account or transaction card into a general ledger.

2. Related Art

Currently, accounting products used by small business owners allow for automatic migration of invoiced purchases associated with a transaction account and/or a transaction card into respective categories in a general ledger portion of the accounting product. This substantially reduces the time and effort needed by the small business owner to balance and reconcile invoiced accounts on a periodic basis. This also allows the small business owner to more freely use their transaction account/card to make business purchases, while substantially reducing their burden of having to manually review all the periods' purchases. This is because any charges associated with an invoiced vendor are automatically migrated by the accounting software into proper categories in the general ledger. Many of these transaction accounts/cards have associated rewards programs, so the small business owner benefits greatly from using them.

However, current accounting products do not allow for migration of non-invoice or point-of-sale transaction information associated with the transaction account/card into the general ledger. This can deter the small business owner from using the transaction account/card to make these kinds of purchases. This can also reduce the potential rewards the small business owner could receive.

Given the foregoing, what is needed is a system, method and computer program product for automatically posting substantially all transaction information associated with a transaction account into a general ledger.

BRIEF DESCRIPTION

The present invention meets the above-identified needs by providing a system, method and computer program product for automatically posting substantially all transactions associated with a transaction account into a general ledger.

In one embodiment, a method for automatically posting substantially all transactions associated with a transaction account to a general ledger of an accounting product is provided comprising: receiving recent transaction data associated with the transaction account, comparing the recent transaction data to stored and categorized transaction data in the general ledger to determine a new transaction data portion of the recent transaction data, categorizing the new transaction data portion, and storing the categorized new transaction data portion in the general ledger.

In another embodiment, a system for automatically posting substantially all transactions associated with a transaction account to a general ledger of an accounting product comprises a storage device, a comparing device, and a categorizing device. The storage device stores categorized data. The comparing device compares received recent transaction data associated with the transaction account to the stored categorized data and generates a new transaction data portion of the recent transaction data. The categorizing device receives and categorizes the new transaction data portion and transmits the categorized new transaction to the storage device.

In a further embodiment, the present invention provides a computer program product comprising a computer useable medium having computer program logic recorded thereon for controlling at least one processor, the computer program logic comprising computer program code modules that perform operations similar to the above-mentioned method and system embodiments.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings. The left-most digit of a reference number identifies the drawing in which the reference number first appears.

DETAILED DESCRIPTION

I. Overview and Terminology

Figure 1:
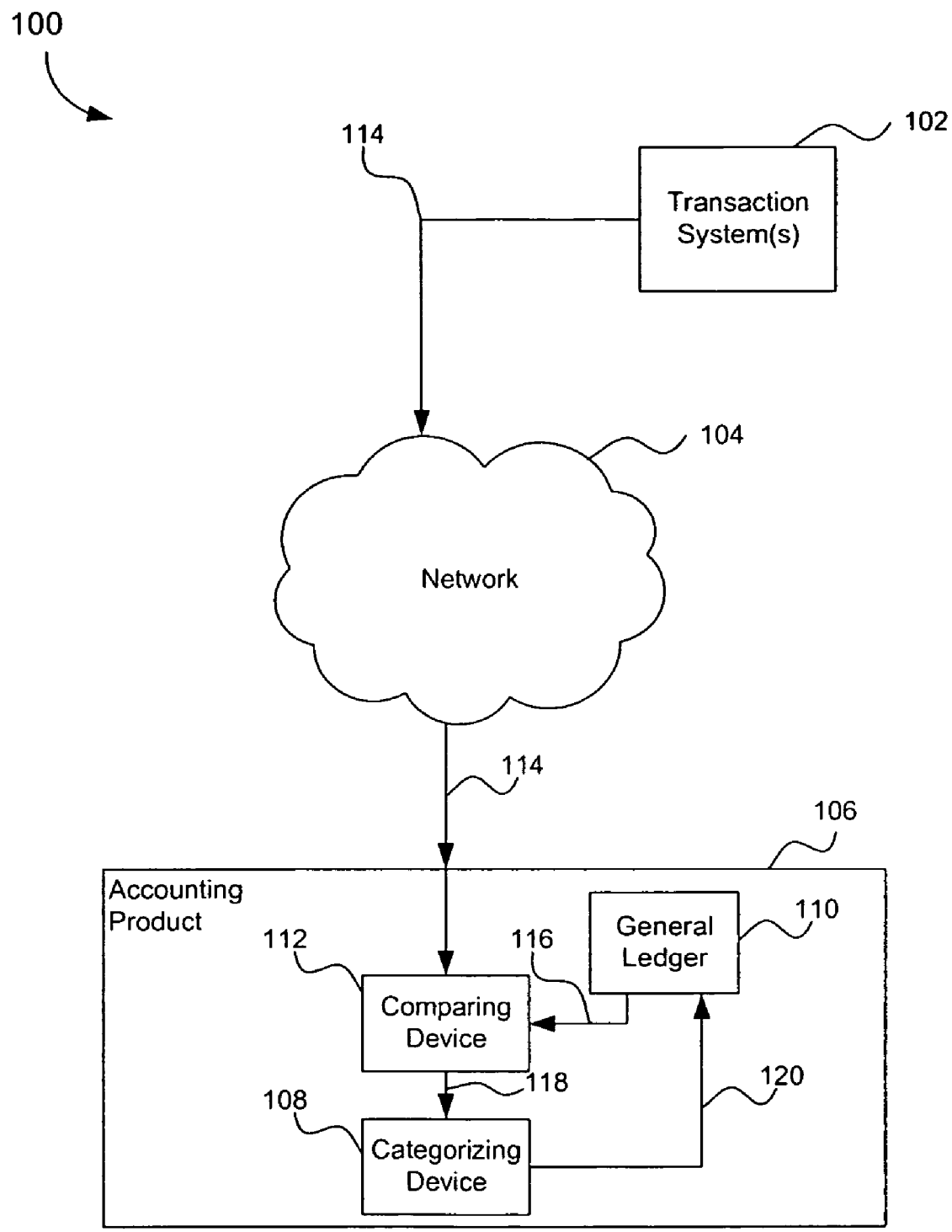
FIG. 1 is a system diagram, according to one embodiment of the present invention.

The present invention is directed to a system, method and computer program product for automatically posting substantially all transactions associated with a transaction account into a general ledger.

The present invention is now described in more detail herein in terms of the above exemplary description. This is for convenience only and is not intended to limit the application of the present invention. In fact, after reading the following description, it will be apparent to one skilled in the relevant art(s) how to implement the following invention in alternative embodiments.

The terms "member," "card member," "user," "end user", "consumer", "customer," "participant," etc., and/or the plural form of these terms are used interchangeably throughout herein to refer to those persons or entities capable of accessing, using, be affected by and/or benefiting from the tool that the present invention provides for searching credit reports using only a partial social security number and other identifying information.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

System Overview

FIG. 1 shows a system 100, according to one embodiment of the present invention. System 100 comprises one or more transaction systems 102 and an accounting product 106. In one example, transaction systems 102 and accounting product 106 are coupled via a network 104.

In various examples, transaction systems 102 can be either point-of-sale transaction systems or network-based transaction systems that allow purchases of products or services using a transaction account or a transaction card associated with the transaction account. Each transaction system 102 can be assigned or associated with a category of goods or services, for example, based on its company name, product, or service, or the like. This category can be used, as discussed below, by a categorizing device 108 to categorize transaction data for storage in a general ledger 110. In one example, a group of the transaction systems 102 can be vendors that invoice the purchaser for each transaction separately from also charging their transaction account for the purchases. However, a group of transaction systems 102 could also be non-invoicing vendors.

In various examples, network 104 can be a wired or wireless network that allows for transmission of transaction information from transaction systems 102 to accounting product 106. For example, network 104 can be a wide area network (WAN), local area network (LAN), Ethernet, Internet, Intranet, Extranet, etc.

In one example, accounting product 106 can be a computer system having underlying software, or software on a computer system, that allows for processing of accounting information. The accounting product 106, and its underlying components, can therefore be hardware, software, firmware, or a combination thereof. In the example shown, accounting product 106 includes a comparing device 112 (matching device), categorizing device 108, and general ledger 110. As just discussed, these elements can be hardware, software, firmware, or combinations thereof. Thus, the use of "device" throughout this description can be a hardware device or a software module that perform a described function. For example, general ledger 110 can be a database or other storage device that stores categorized accounting information. In various examples, accounting product 106 can be Quickbooks®, ACC®, MAS90®, Great Plains®, or others.

In an exemplary operation, transaction system 102 sends a transaction data signal 114 (e.g., transaction information, where data and information can be used interchangeably), either when prompted or at periodic intervals (e.g., hourly, daily, weekly, monthly, etc.), to accounting product 106. In various examples, transaction data signal 114 can be sent directly to accounting product 106 or sent via network 104. Transaction data signal 114 is received at comparing device 112 along with stored transaction data signal 116 from general ledger 110. These two signals 114 and 116 are compared in comparing device 112 (i.e., a matching operation is performed) to determine what information in transaction data signal 114 is not already stored in general ledger 110. A new transaction data portion signal 118 is generated based on the comparison, which is transmitted to categorizing device 108. Categorizing device 108 analyzes the categories previously established in general ledger 110 and determines which category in general ledger 110 would be the most appropriate to categorize each transaction in new transaction data portion 118. After making this determination, categorizing device 108 transmits an information signal 120, which includes the transaction data and the category, to general ledger 110 so that the transaction data can be saved in the appropriate category of general ledger 110.

Thus, according to this embodiment of the present invention, substantially all transaction information associated with a transaction account can be automatically categorized and saved in the appropriate category in general ledger 110.

In one example, new transaction data portion signal 118 can be non-invoice purchases, point-of-sale purchases, internet purchases, or the like made on a transaction account, possibly using a transaction card associated with the account. In a small company environment not all purchases made on a company transaction account associated with a transaction card may be business related and/or from a previously established business vendor. The business related and/or vendor based purchases are typically noted on a transaction account and also invoiced to the small business owner. Invoiced purchases can normally be automatically posted to a general ledger associated with accounting product 106 based either on the functionality of accounting product 106 or based on software used in conjunction with accounting product 106, for example RewardWorks®, or a version thereof, manufactured and sold by Zevez Corporation of Tualatin, Oreg. However, many purchases made by the small business owner on the transaction account may not be invoiced, but the transactions are required or desired to be posted to general ledger 110. As discussed above, in previous accounting products this would typically have to be done manually. However, through use of system 100, these non-invoiced purchases that are associated with the transaction account can now be automatically posted to general ledger 110.

Process Overview

Figure 2:
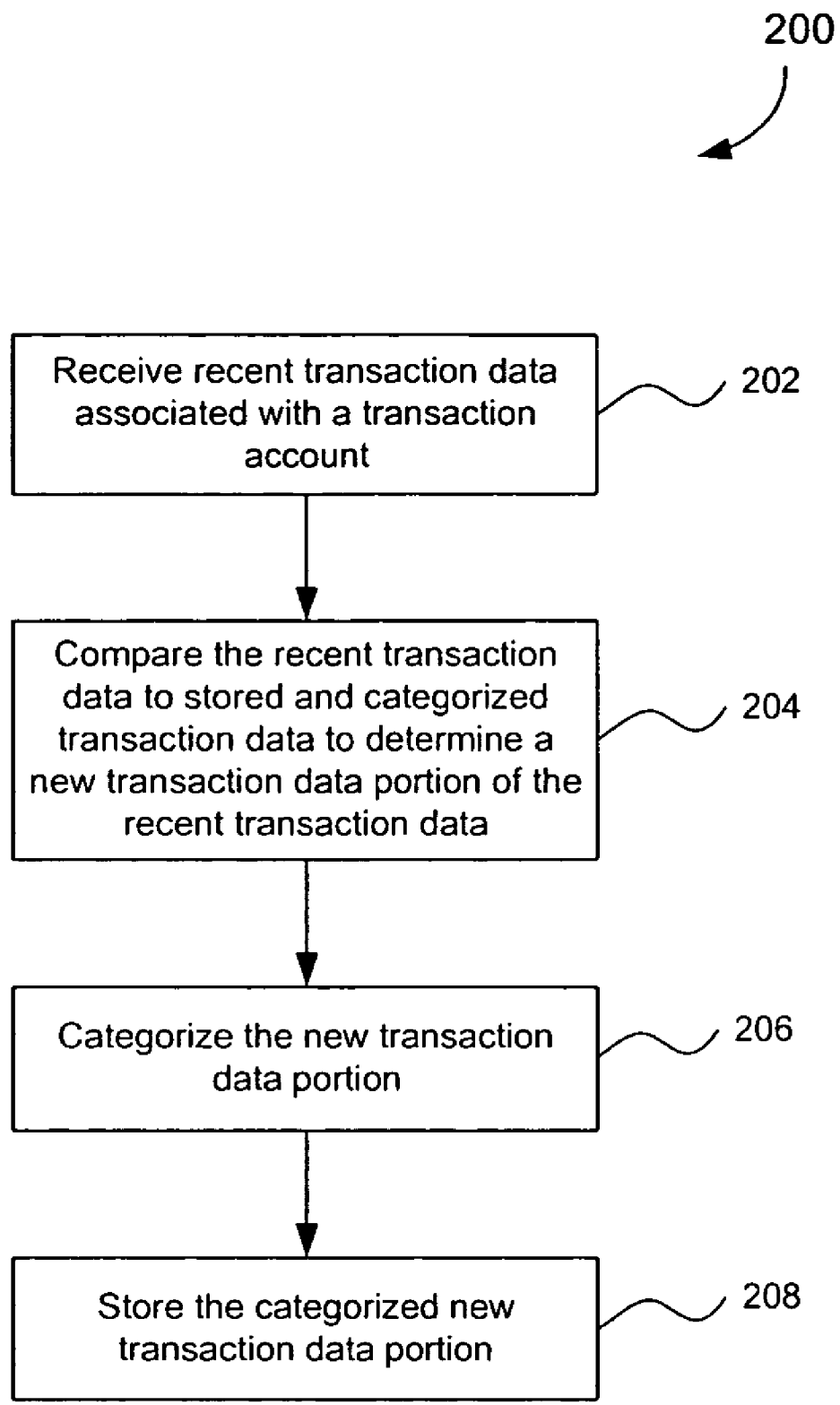
FIGS. 2 and 3 are flowcharts illustrating various processes, according to various embodiments of the present invention.
Figure 3:
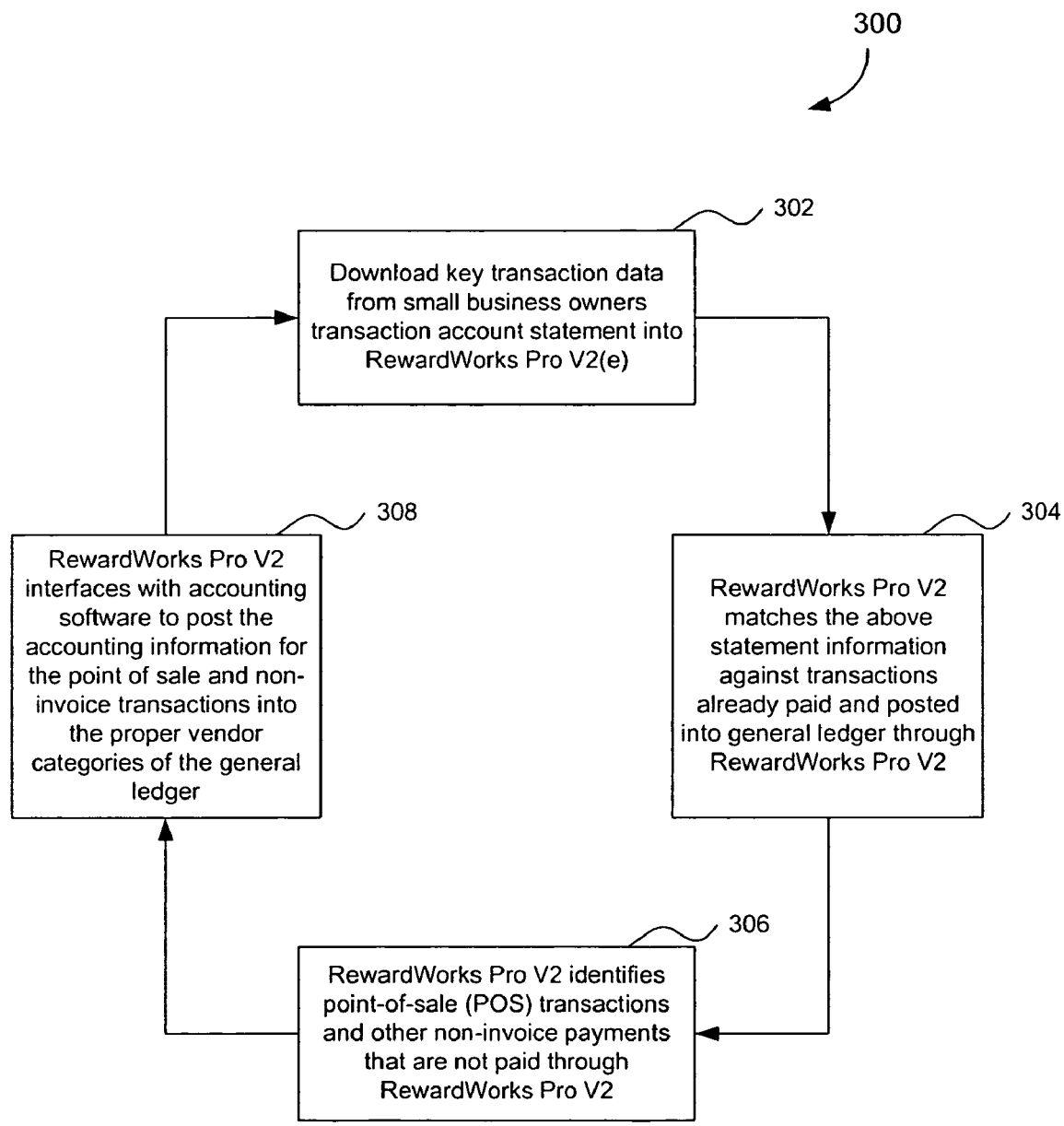

FIGS. 2 and 3 are flowcharts illustrating various processes, according to various embodiments of the present invention. In one example, these processes can be performed using system 100.

FIG. 2 shows a flowchart 200, according to one embodiment of the present invention. In step 202, recent transaction data associated with a transaction account is received. In step 204, the recent transaction data is compared (e.g., matched) to stored and categorized transaction data to determine a new transaction data portion of the recent transaction data. In step 206, the new transaction data portion is categorized. In step 208, the categorized new transaction data portion is stored.

FIG. 3 shows a flowchart 300, according to one embodiment of the present invention. In step 302, key transaction data of charges made on a small business owner's transaction account/card is downloaded. In step 304, a secondary software program (e.g., RewardWorks Pro V2), running along side and interfaced with an accounting product matches the above information against transactions already paid and posted into a general ledger storage associated with the accounting product. In step 306, point of sale and other non-invoice transactions are identified that were not paid through the secondary software program. In step 308, the accounting information for the point of sale and other non-invoice transactions is posted into proper vendor categories of the general ledger storage.

EXAMPLE IMPLEMENTATIONS

The present invention (i.e., system 100 and processes 200 and 300 in FIGS. 2 and 3, or any part(s) or function(s) thereof) may be implemented using hardware, software or a combination thereof and may be implemented in one or more computer systems or other processing systems. However, the manipulations performed by the present invention were often referred to in terms, such as receiving or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 4:
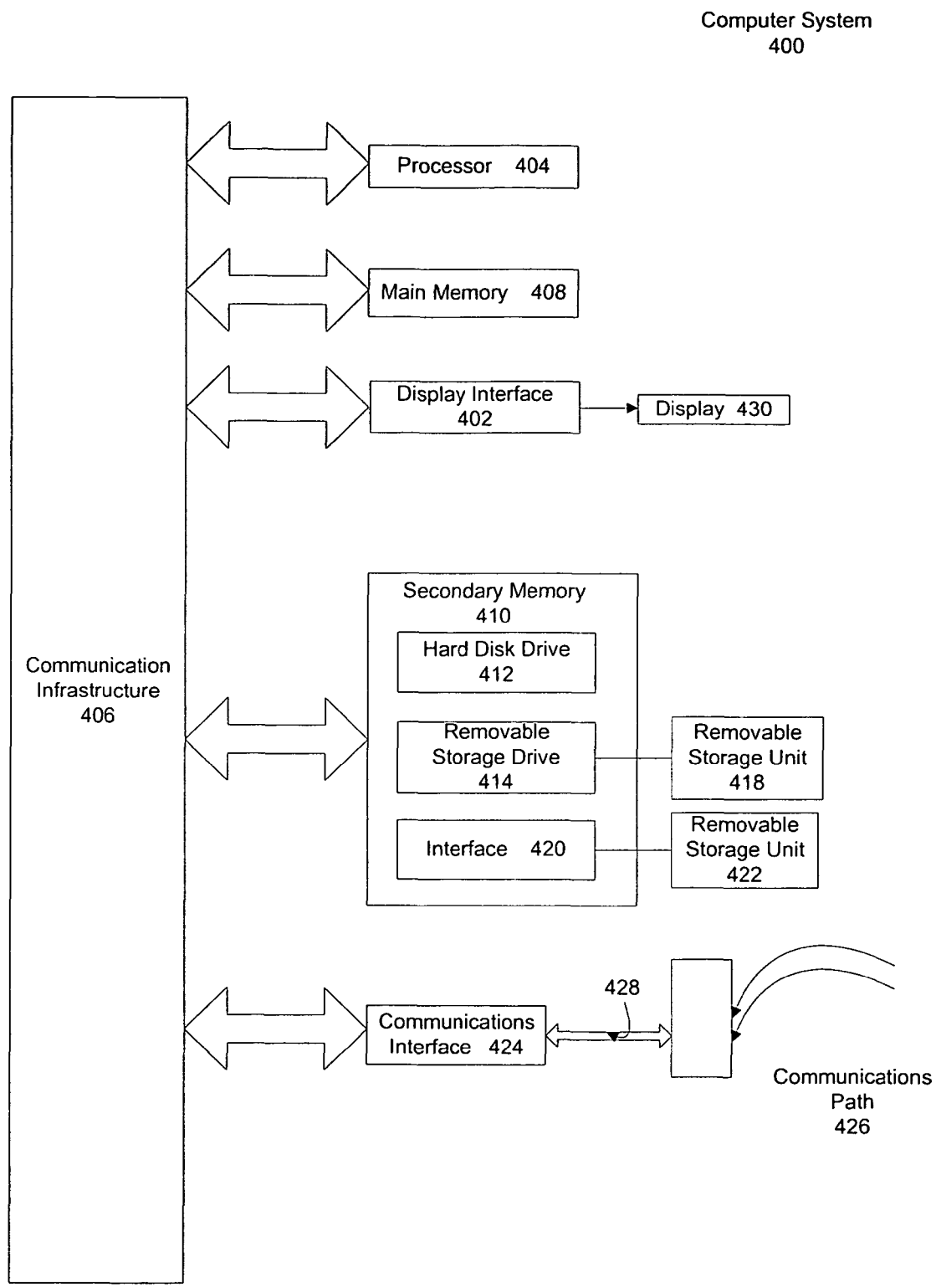
FIG. 4 is a block diagram of a sample computer system that can be used in the implementation of one or more embodiments of the present invention.

In fact, in one embodiment, the invention is directed toward one or more computer systems capable of carrying out the functionality described herein. An example of a computer system 400 is shown in FIG. 4.

The computer system 400 includes one or more processors, such as processor 404. The processor 404 is connected to a communication infrastructure 406 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 400 can include a display interface 402 that forwards graphics, text, and other data from the communication infrastructure 406 (or from a frame buffer not shown) for display on the display unit 430.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418 represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 414, a hard disk installed in hard disk drive 412, and signals 428. These computer program products provide software to computer system 400. The invention is directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features of the present invention, as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention ). Thus, the present invention should not be limited by any of the above described exemplary embodiments, but should be defined only in accordance with the following claims and their equivalents.

In addition, it should be understood that the figures, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
   receiving, by a computer based system for automatically posting transactions to a general ledger, recent transaction data associated with a transaction account, wherein the recent transaction data represents a non-invoice transaction;
   comparing, by the computer based system, the recent transaction data to stored categorized transaction data in the general ledger to determine a new transaction data portion of the recent transaction data;
   categorizing, by the computer based system, the new transaction data portion based on the comparing of the stored categorized transaction data; and
   storing, by the computer based system, the categorized new transaction data portion in a memory of the general ledger, wherein the recent transaction data not determined to be new transaction data is not stored in the memory of the general ledger.

2. The method of claim 1, wherein the recent transaction data represents a point-of-sale transaction.

3. The method of claim 1, wherein the categorizing comprises associating vendor names, services, or products to corresponding portions of the recent transaction data.

4. The method of claim 1, wherein the recent transaction data represents an internet purchase transaction.

5. The method of claim 1, wherein
   the recent transaction data represents at least one of a point-of-sale, and an internet purchase transaction; and
   the categorizing step comprises associating at least one of vendor names, services, or products to corresponding portions of the recent transaction data.

6. The method of claim 1, wherein the recent transaction data data is not categorized through a user inputting categorization data.

7. A computer based system, comprising:
   a computer network communicating with a memory of a general ledger;
   the memory communicating with a processor; and
   the processor, when executing a computer program for automatically posting transactions to the general ledger, is configured to:
   receive recent transaction data associated with a transaction account, wherein the recent transaction data represents a non-invoice transaction;
   compare the recent transaction data to stored categorized transaction data in the general ledger to determine a new transaction data portion of the recent transaction data;
   categorize the new transaction data portion based on the comparing of the stored categorized transaction data; and
   store the categorized new transaction data portion in the memory, wherein the recent transaction data not determined to be new transaction data is not stored in the memory.

8. The computer based system of claim 7, wherein the storage device, the comparing device, and the categorizing device are part of an accounting product.

9. The computer based system of claim 7, wherein the categorizing the recent transaction data portion is based on at least one of a respective vendor name, product, or service.

10. The computer based system of claim 7, wherein the recent transaction data portion represents a point-of-sale transaction.

11. The computer based system of claim 7, wherein the recent transaction data represents an internet purchase transaction.

12. The computer based system of claim 7, wherein
    the recent transaction data represents at least one of a point-of-sale and an internet purchase transaction; and
    the categorizing device categorizes the recent transaction data based on at least one of a respective vendor name, product, or service.

13. The computer based system of claim 7, wherein the recent transaction data data is not categorized through a user inputting categorization data.

14. A non-transitory computer-readable medium having stored thereon a plurality of instructions for causing a computer automatically post transactions to a general ledger, the plurality of instructions, when executed by a processor, are configured to cause the processor to perform operations comprising:
  receiving recent transaction data associated with the transaction account, wherein the recent transaction data represents a non-invoice transaction;
  comparing the recent transaction data to stored categorized transaction data in the general ledger to determine a new transaction data portion of the recent transaction data;
  categorizing the new transaction data portion based on the comparing of the stored categorized transaction data; and
  storing the categorized new transaction data portion in the general ledger, wherein the recent transaction data not determined to be new transaction data is not stored in the memory of the general ledger.

15. The computer-readable medium of claim 14, wherein the recent transaction data represents at least one of a point-of-sale and an internet purchase transaction.

16. The computer-readable medium of claim 14, wherein the categorizing comprises associating at least one of vendor names, services, or products to corresponding portions of the recent transaction data.

17. The computer-readable medium of claim 14, wherein
  the recent transaction data represents at least one of a point-of-sale and an internet purchase transaction; and
  the categorizing comprises associating at least one of vendor names, services, or products to corresponding portions of the recent transaction data.

* * * * *